United States Patent
Kutscher et al.

(10) Patent No.: US 8,811,178 B2
(45) Date of Patent: Aug. 19, 2014

(54) METHOD FOR RESOURCE MANAGEMENT WITHIN A WIRELESS NETWORK AND A WIRELESS NETWORK

(75) Inventors: Dirk Kutscher, Heidelberg (DE); Faisal-Ghias Mir, Heidelberg (DE); Giorgio Nunzi, Heidelberg (DE); Henrik Lundqvist, Heidelberg (DE); Marcus Brunner, Leimen (DE)

(73) Assignee: NEC Europe Ltd., Heidelberg (DE)

( * ) Notice: Subject to any disclaimer, the term of this patent is extended or adjusted under 35 U.S.C. 154(b) by 158 days.

(21) Appl. No.: 13/518,212

(22) PCT Filed: Dec. 21, 2010

(86) PCT No.: PCT/EP2010/007821
§ 371 (c)(1),
(2), (4) Date: Jun. 21, 2012

(87) PCT Pub. No.: WO2011/076384
PCT Pub. Date: Jun. 30, 2011

(65) Prior Publication Data
US 2012/0257505 A1    Oct. 11, 2012

(30) Foreign Application Priority Data

Dec. 23, 2009  (EP) .................................... 09015981

(51) Int. Cl.
*H04L 1/00* (2006.01)
*H04L 12/56* (2006.01)
*H04W 28/02* (2009.01)

(52) U.S. Cl.
CPC ................ *H04L 47/26* (2013.01); *H04L 47/32* (2013.01); *H04W 28/0205* (2013.01); *H04L 47/20* (2013.01)
USPC .......................................... 370/235

(58) Field of Classification Search
CPC . H04L 47/30; H04L 47/24; H04L 2012/5631; H04W 80/04
USPC ............. 370/235, 230, 338, 352, 395.21, 401
See application file for complete search history.

(56) References Cited

U.S. PATENT DOCUMENTS

| 7,684,436 | B2 | 3/2010 | Nakayama et al. | |
| 8,451,773 | B2 * | 5/2013 | Jiao et al. | 370/328 |

(Continued)

FOREIGN PATENT DOCUMENTS

| EP | 2 106 076 A1 | 9/2009 |
| JP | 2007511174 A | 4/2007 |

(Continued)

OTHER PUBLICATIONS

International Search Report, dated Mar. 31, 2011, from corresponding PCT application.

(Continued)

*Primary Examiner* — Chandrahas Patel
(74) *Attorney, Agent, or Firm* — Young & Thompson (57) ABSTRACT

For allowing a very effective resource management and network utilization a method for resource management within a wireless network, especially EPS (Evolved Packet Core) of LTE (Long Term Evolution) network, is described, wherein a congestion control of data-traffic is performed. The method is characterized in that for congestion control a Re-ECN (Explicit Congestion Notification) function will be used wherein the Re-ECN function includes a policing function and a dropping function. Further, a corresponding wireless network is described, preferably for carrying out the above mentioned method.

21 Claims, 5 Drawing Sheets

(56) References Cited

U.S. PATENT DOCUMENTS

| | | | |
|---|---|---|---|
| 8,553,554 B2* | 10/2013 | Kahn et al. | 370/236 |
| 2005/0147041 A1 | 7/2005 | Zaki et al. | |
| 2006/0126509 A1 | 6/2006 | Abi-Nassif et al. | |
| 2007/0036079 A1 | 2/2007 | Chowdury et al. | |
| 2008/0186918 A1 | 8/2008 | Tinnakornsrisuphap et al. | |
| 2009/0285099 A1 | 11/2009 | Kahn et al. | |
| 2011/0080831 A1 | 4/2011 | Ludwig et al. | |

FOREIGN PATENT DOCUMENTS

| | | | |
|---|---|---|---|
| JP | 2010537532 A | 12/2010 | |
| WO | 03107611 A1 | 12/2003 | |
| WO | 20091008817 A1 | 1/2009 | |
| WO | 2009024501 A1 | 2/2009 | |

OTHER PUBLICATIONS

Briscoe et al., "Adding Accountability for Causing Congestion to TCP/IP", Internet-Draft dated Mar. 3, 2009, URL; http://tools.ietf.org/html/draft-briscoe-tsvwg-re-ecn-tcp-07.

Briscoe et al., "A Framework for adding Congestion Accountability to TCIP/IP", Internet-Draft dated Sep. 18, 2009, URL; http://tools.ieff.org/html/draft-briscoe-tsvwg-re-ecn-tcp-motivation-01.

Ericsson, Alcatel-Lucent, AT&T, TeliaSonera, "AMBR per UE", 3GPP TSG-SA WG2#64, S2-082167, Apr. 11, 2008 <URL:http://www.3gpp.org/f tp/tsg_sa/WG2_Arch/TSGS2_64_Jeju/Docs/S2-082167.zip>.

Huawei, Ericsson, IP Wireless, Nextwave, "Signalling of AMBR", 3GPP TSG-SA WG2 Architecture—S2#59, S2-073684, Aug. 31, 2007, <URL:http://www.3gpp.org/f tp/tsg_sa/WG2_Arch/TSGS2_59_Helsinki/Docs/S2-073684.zip>.

* cited by examiner

METHOD FOR RESOURCE MANAGEMENT WITHIN A WIRELESS NETWORK AND A WIRELESS NETWORK

The present invention relates to a method for resource management within a wireless network, especially EPS (Evolved Packet Core) of LTE (Long Term Evolution) network, wherein a congestion control of data traffic is performed. Further, the present invention relates to a wireless network, especially EPS (Evolved Packet Core) of LTE (Long Term Evolution) network, wherein a congestion control of data traffic is performed.

BACKGROUND OF THE INVENTION

Communication resource management is an important feature in commercial wireless communication networks, because it enables Quality of Service (QoS) provisioning, good network utilization etc. Traditionally, QoS has been a crucial feature to guarantee predictable user experience for fixed bitrate services such as voice communication, which is the reason why reservation of resources, different quality of service classes are used in the UMTS access network (UTRAN).

Data communication—in most cases: Internet communication—is normally treated as non-GBR traffic, i.e., traffic that does not require guaranteed bitrates and strict resource reservation. This is based on the assumption that such traffic would use transport protocols such as TCP (Transmission Control Protocol) that is generally able to adapt to changing path characteristics.

The increasing popularity of wireless Internet services has led to a significant increase of data usage in UMTS, and further increases are expected for LTE networks. With regard to LTE networks and E-UTRAN see 3GPP TS 36.401. For the deployment of LTE with its increasing data rates, managing increasing volumes of non-guaranteed bitrate traffic—non-GBR, best effort data traffic—with satisfactory user experience is becoming a daunting task for the mobile operators. Because of the popular and ubiquitous flat-rate data tariffs and the proliferation of wireless USB (Universal Serial Bus) adapters for portable computers, there is no incentive for users to use the network responsibly, which leads to unrestricted network usage, high load and thus often sub-optimal overall quality of experience for non-GBR traffic.

One of the problems is that a heavy user, e.g., using P2P (Peer-to-Peer) file sharing, can significantly impact the quality of experience of other users (as long as their communication session are sharing resources). For elastic data traffic there has long been a conception in the Internet community that TCP, the dominant transport protocol, provides the necessary fairness, as its congestion control algorithm reacts to observed congestion by reducing the sending rate, which would normally lead to a "fair" distribution of the available bandwidth between competing TCP flows. However, the notion of per-flow fairness is more an implicit property of the congestion control, and it operates on the flow level and cannot take multiple flows per users into account. A user with N active flows could therefore use a significant higher fraction of the available bandwidth compared to user with only 1 active flow. Also, it can obviously not consider long-term behavior of users, see Flow Rate Fairness: Dismantling a Religion, Bob Briscoe (BT & UCL), ACM Computer Communications Review 37(2) 63-74 (April 2007), because it applies to resource distribution at a certain point in time only. Hence TCP congestion control is not an effective mechanism for achieving any kind of fairness and cannot provide any form of long-term fairness between users with respect to communication resource usage in wireless access networks.

To have at least some means of controlling resource usage, operators apply other techniques, e.g., monthly volume limits and a different treatment of specific applications such as P2P and VoIP (Voice over IP). This per-application control is often implemented traffic management based on Deep Packet Inspection (DPI), see http://en.wikipedia.org/wiki/Deep_packet_inspection. DPI can increase the average satisfaction level of the users by inspecting the transport and application layer protocol headers and make educated guesses about the user preferences for different types of traffic. The operator then implements policies that are intended to improve the application performance without any involvement of the end-systems or users. However, not all users will be satisfied by the policies implemented, and countermeasures may be taken to avoid the policies. Moreover, this approach is considered problematic because of its complexity and also with respect to on-going changes in legislation and regulation with respect to net neutrality.

Another fundamental problem within DPI is that, while it is in general possible to limit the available bandwidth for users—either generally, after they have exceeded their monthly volume, or specifically for certain applications—this is a rather inefficient way of resource management, because traffic is limited regardless of the current network utilization. Even if—at a certain time—sufficient capacity for running P2P applications would be available, this cannot be used because of the rather static limits. Fundamentally such solutions do not recognize that high-bandwidth/high-applications are not a problem in general—the actual problem is congestion, and for scenarios where congestion occurs, resource management and accountability mechanisms should be in place to enable a better overall usability of the network.

One of the approaches that address this problem is the Re-Feedback concept, see Briscoe, B., Jacquet, A., Di Cairano-Gilfedder, C., Salvatori, A., Soppera, A., and Koyabe, M. 2005. Policing congestion response in an internetwork using re-feedback. *SIGCOMM Comput. Commun. Rev.* 35, 4 (October 2005), 277-288, which is based on the notion of accounting for congestion—and not for traffic volume. The fundamental idea is that network elements are able to detect congestion events and apply congestion marks onto data packets that are sent from a sender to a receiver, e.g., using TCP as a transport protocol. These congestions marks reach the receiver, and the receiver is able to convey this information—as congestion feedback—back to the original sender by leveraging a return channel of a transport protocols, e.g., acknowledgments in TCP. The congestion feedback has the semantics of observed contribution to the path congestion by a specific flow. The sender is able to re-act to this feedback, e.g., by reducing the sending rate. But more important, the Re-Feedback concept stipulates that the sender uses this feedback to declare its contribution to congestion to the network by adding some information to the sent packets in the next round-trips.

The network—e.g., policing entities—can use this congestion declaration to account for congestion per user (or per flow) and apply policies based on that. E.g., such a policy could enforce a certain congestion-budget per month; once this has been reached, no further contribution to congestion is allowed, i.e., packets of that user would be dropped preferentially when there is congestion. As a consequence, users get a clear incentive to use the network responsibly—by receiving negative feedback when they contribute to congestion.

Figure 1:
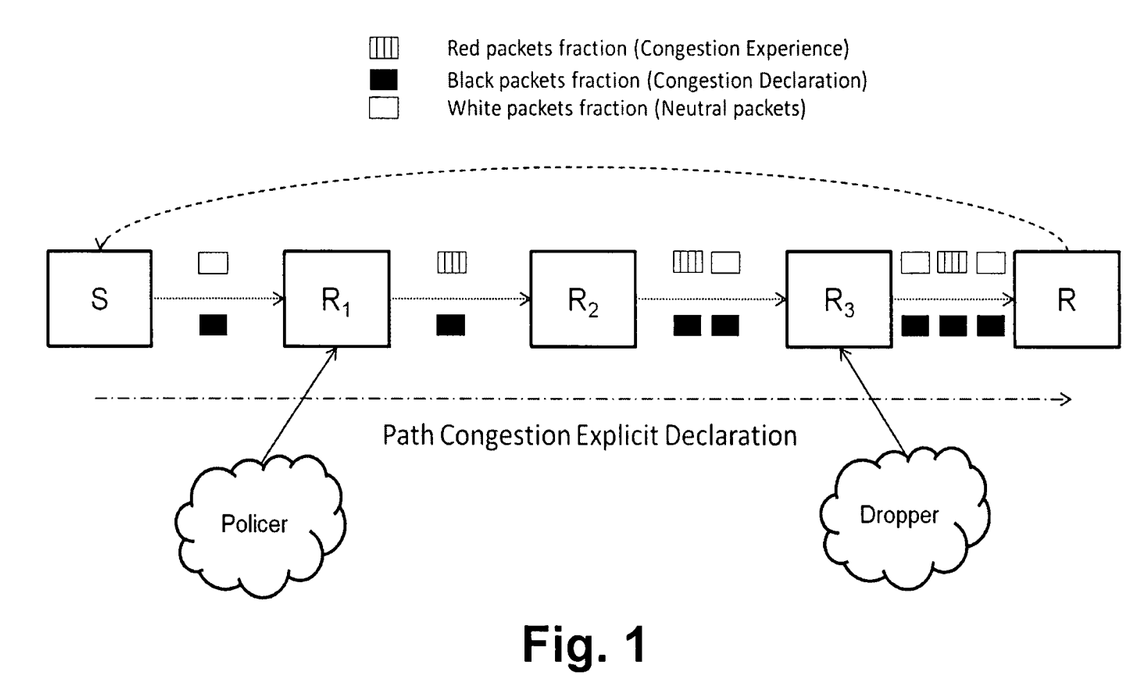
FIG. 1 is showing a schematic overview of a Re-ECN function.

The Re-Feedback concepts as described in Briscoe, B., Jacquet, A., Di Cairano-Gilfedder, C., Salvatori, A., Soppera, A., and Koyabe, M. 2005. Policing congestion response in an internetwork using re-feedback. *SIGCOMM Comput. Commun. Rev.* 35, 4 (October 2005), 277-288, have been implemented as a concrete specification for IP networks called Re-ECN (Explicit Congestion Notification) in http://tools.ietf.org/html/draft-briscoe-tsvwg-re-ecn-tcp-09 (Internet Draft, work in progress). In addition to a specification of packet marking syntax and semantics, Re-ECN specifies specific network elements and their behavior in http://tools.ietf.org/html/draft-briscoe-tsvwg-re-ecn-tcp-motivation-02 (Internet Draft, work in progress). An overview of the required elements is depicted in FIG. 1.

The following network elements are involved:
Sender S: sending IP packets, using transport protocol with feedback channel, understanding ECN marking semantics, supporting Re-ECN-based congestion declaration;
IP router $R_1$, $R_2$ and $R_3$ with ECN support: marking IP-packets based on observed congestion for egress queue;
Receiver R: receiving IP packets, using transport protocol with feedback channel to convey accumulated congestion information;
Policer: traffic-policing entity that uses information from congestion exposure to police user traffic and to account for user traffic; and
Dropper: enforcement entity ensuring correct congestion declaration.

Once a router (for LTE eNB) marks a packet for indicating congestion, it set bits in IP packet, and this bit sequence is called CE (Congestion Experience). For better illustration, a CE-marked packet is called a "red packet" in the context of congestion exposure.

For reference, there is provided the following explanation:
Red Packet=CE code point (accumulated red packets represent the congestion fraction). Black Packet=Re-Echo code point (accumulated black packets represent the congestion response fraction). White Packet=ECT code point. That neither carries congestion information nor the response information. A complete description of this scheme is available at http://tools.ietf.org/html/draft-briscoe-tsvwg-re-ecn-tcp-09.

The different packet marking options are symbolized by different colors in this description: red packets are congestion-marked packets, i.e., marked by IP routers with ECN support, and black packets are congestion-declared packets, i.e., packets that have been marked by a sender, based on the received feedback from the receiver. White packets do not carry congestion nor response information.

The policer is placed at the ingress of the network, close to the sender, where traffic originating from different sources has not been mixed yet. The sender declares path state congestion by inserting black packets into the flow. The policer acts as a rate limiter for black packets. Each packet is examined before it is accepted into the network. It implicitly defines an upper bound on congestion that a user is allowed to cause in network: e.g. congestion quota over a time period. Potentially, if a sender is exceeding its congestion quota, a policer may start dropping packets from that flow.

How exactly a policer is implemented is a prerogative of the network operator. Various types of policies could be defined for various types of customers. Policing could be implemented on per user or per flow basis. An instance of policer is instantiated depending on how accountability is needed.

In addition to the policer, there is another entity, called dropper, that is responsible for enforcing that senders declare their congestion contribution correctly. The goal of re-feedback mechanism is balancing on average red and black packet fractions closer to receiver. Senders may try to cheat the system by being dishonest when declaring the path congestion, i.e. by not inserting a number of black packets that correspond to the number of white packets it has been informed about. Therefore the re-feedback framework contains a dropper that should catch malicious senders by maintaining some state about flows in the dropper which is located close to receiver.

If the difference on average, between black and red fractions is persistently—over time—positive in a particular flow, it implies sender is taking a stronger congestion response by sending more black packets into network than required. We can say a sender is overstating its path congestion and refer to this as a positive flow.

Today an effective and flexible congestion control of data traffic within wireless networks is not known, so that network resource utilization is not optimized within such wireless networks.

Thus, it is an object of the present invention to improve and further develop a method for resource management within a wireless network and an according wireless network for allowing a very effective resource management and network utilization.

SUMMARY OF THE INVENTION

In accordance with the invention, the aforementioned object is accomplished by a method and by a wireless network as recited by the claims and as presented in the drawings and the written description that follows.

According to one embodiment of the invention, the method is characterized in that for congestion control a Re-ECN (Explicit Congestion Notification) function will be used wherein the Re-ECN function comprises a policing function and a dropping function.

According to another embodiment of the invention, the wireless network is characterized in that for congestion control a Re-ECN (Explicit Congestion Notification) function is implemented within the network wherein the Re-ECN function is comprising a policing function and a dropping function.

According to the invention it has been recognized that it is possible to allow for a very effective resource management within a wireless network by simply applying a Re-ECN function, which is already known within common non-wireless networks, to a wireless network. With the implementation of such a Re-ECN function a reliable congestion control is possible which is resulting in a very effective resource management and network utilization.

Within a preferred embodiment and with regard to an effective resource management, especially within an uplink direction, wherein a User Equipment (UE) is sending to the internet, for example, the policing function could be placed at a base station or an eNodeB. In this case the policing function could be placed near a User Equipment for considering generally the traffic from the User Equipment and not from other network elements.

With regard to a reliable conservation of radio allocations within the wireless network the policing function could be placed at the MAC (Media Access Control) layer in the eNodeB.

With regard to a very effective placement of the dropping function the dropping function could be placed at a gateway or a Packet-Gateway (P-GW). Thus, a dropping of packets could be performed before entering the internet, for example.

For conserving processing requirements at the base station or eNodeB within the downlink situation, the dropping function could be triggered at the base station or at the eNodeB.

With regard to a very reliable performance of the Re-ECN function control messages could be conveyed from the gateway or P-GW to the base station or eNodeB.

Within a preferred embodiment the policing function could be distributed onto the P-GW and the eNodeB. This will provide a very efficient implementation of a Re-ECN function.

For optimization of the efficiency of the dropping function and of the efficiency of network utilization the dropping function could be triggered on-demand. On the basis of such a functionality the dropping function could be activated in a special situation by a respective trigger activity.

Particularly with regard to an incorporation of the Re-ECN function at the MAC layer in an E-UTRAN, the policing function could be divided in two distinct phases comprising a measurement phase and an enforcement phase.

Within a preferred situation the policing function or a policer instance could be associated with user data traffic at a gateway or at a P-GW during the measurement phase.

Within a very simple embodiment the policing function or the policer instance could be triggered by detecting a data flow or Service Data Flow (SDF) at the gateway or P-GW. The policing function or the policer instance could enforce the rate control on the user traffic against an allowed congestion quota that the user is allowed to cause in the network over a configured time period.

For saving radio allocations the enforcement phase could be triggered on an expiry of a congestion allowance assigned to a definable user. No enforcement will be performed without triggering.

During the enforcement phase the policing function could signal a MAC scheduler operating at the base station or eNodeB to downgrade the service rate of the definable user. Within a preferred embodiment the used signalling could be based on existing control messages conveyed from the gateway or P-GW to the base station or eNodeB. The use of existing control messages will simplify the whole method.

Further, a maximum allowed sending rate could be modified by the interaction between the gateway or P-GW and the base station or eNodeB.

With regard to the case of downlink traffic the overall fraction of congestion packets and congestion response packets at the base station or eNodeB could be taken as an indicator for estimating path congestion characteristics.

There are two preferred methods for congestion control within a downlink path from a gateway or P-GW to a User Equipment. Within one preferred alternative a dropping function could be activated at the gateway or P-GW, once the following condition is met: weighted (congestion fraction)$_{downlink}$-weighted (congestion response fraction)$_{downlink}$>threshold, wherein the threshold has a definable value. In this situation a measurement of the behaviour of a sender will be performed at the base station or eNodeB and the dropping of packets will be performed at the gateway or P-GW. Such a distributed dropping behaviour optimizes the resource usage between a gateway or P-GW and a User Equipment.

Within a second alternative embodiment a dropping function could be activated at the base station or eNodeB, once the following condition is met: weighted (congestion fraction)$_{downlink}$-weighted (congestion response fraction)$_{downlink}$>threshold, wherein the threshold has a definable value. In this situation a measurement and dropping of packets will be performed at the same place, namely at the base station or eNodeB. This embodiment is very simple, however, it does not optimize the bandwidth usage between the gateway or P-GW and the UE, as all packets will be transmitted from the gateway or P-GW to a base station of eNodeB, before a dropping of selected packets will be performed.

Within a preferred embodiment the weighting algorithm could comprise a running average over a definable time window across all data flows at a particular base station or eNodeB, preferably Exponentially Weighted Moving Averages (EWMA).

The present invention solves the problem of efficiently implementing Re-ECN functions for policing and dropping packets within a wireless network or within the E-UTRAN for optimizing network resource utilization. Since Re-ECN has not yet been defined for wireless access networks, it is required to consider special requirements resulting from user mobility, limited computational resources on network elements and scalability with respect to number of users. Therefore, this invention proposes within a preferred embodiment to distribute the policing function onto the PDN-Gateway and the eNodeB and to optimize the efficiency of the dropping function by triggering it on-demand.

Important aspects of the present invention together with preferred embodiments are as follows:
 efficiently implement Re-ECN functions for policing and dropping in the E-UTRAN for optimizing network resource utilization;
 distribute the policing function onto the PDN-Gateway and the eNodeB;
 optimize the efficiency of the dropping function by triggering it on-demand;
 enabling congestion accountability in LTE;
 better network utilization in LTE networks;
 better quality of experience for non-GBR traffic in LTE; and
 fair resource sharing without sacrificing net neutrality.

BRIEF DESCRIPTION OF THE DRAWINGS

There are several ways how to design and further develop the teaching of the present invention in an advantageous way. To this end it is to be referred to the patent claims subordinate to patent claim 1 on the one hand and to the following explanation of preferred examples of embodiments of the invention, illustrated by the drawing on the other hand. In connection with the explanation of the preferred embodiments of the invention by the aid of the drawing, generally preferred embodiments and further developments of the teaching will we explained. In the drawings

DETAILED DESCRIPTION OF THE PREFERRED EMBODIMENTS

The Re-ECN framework and specifications have not been explicitly conceived for wireless access networks up to now. When applying the Re-ECN specification to the LTE access network, it is important to map the involved entities—policer and dropper—to appropriate components in the E-UTRAN architecture as depicted by the embodiment in FIG. 2.

Figure 2:
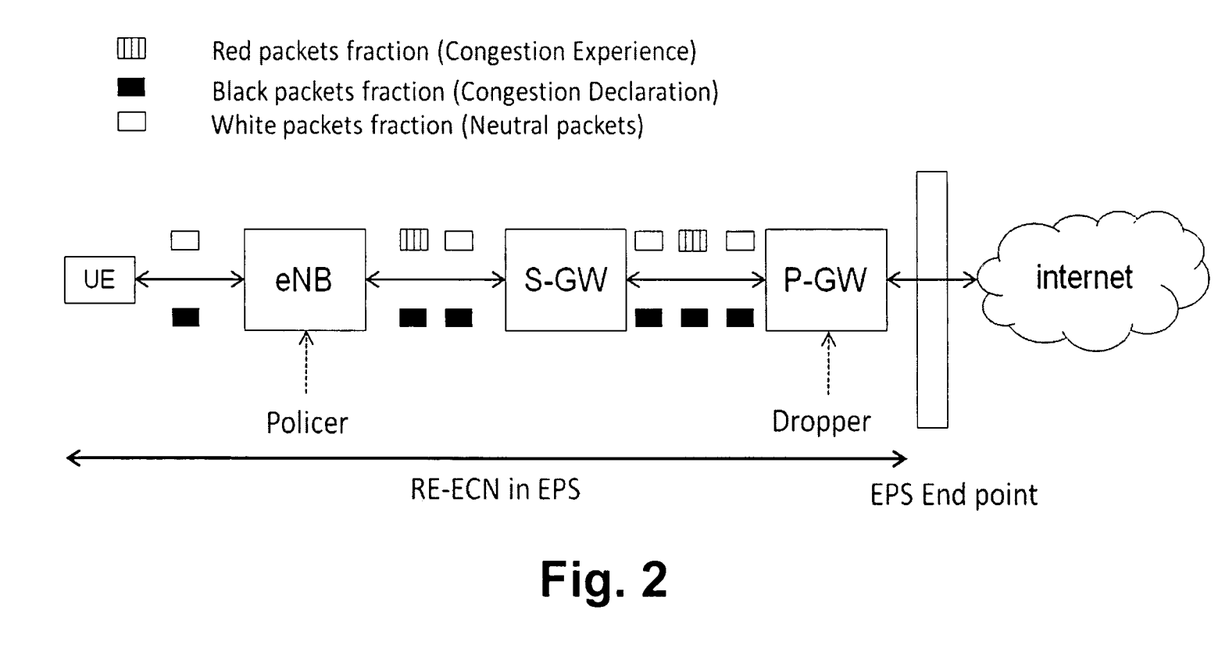
FIG. 2 is illustrating a first embodiment of an implementation of Re-ECN function within E-UTRAN according to the invention.

In this example for Re-ECN-based resource control for the uplink direction—UE sending to the Internet—, the Re-ECN Policer would be placed at the eNode (eNB—wireless base station in LTE), and the Re-ECN dropper would be placed at the Packet-Gateway (P-GW).

The present invention proposes a new de-centralized mechanism for the incorporation of Re-ECN functional entities, policer and dropper, in the EPS (Evolved Packet System). For the uplink traffic, such a scheme aims at conserving the radio allocations in the E-UTRAN therefore this invention proposes the policer enforcement at the MAC layer in the eNB. Similarly, for conserving the processing requirements at the eNB for the downlink case, this invention also proposes the condition for triggering the Re-ECN Dropper at the eNB for policing traffic of non compliant Re-ECN senders. For both enforcements control messages must be conveyed from the gateway to the eNB.

Distributed Policing for Uplink Traffic

Figure 3:
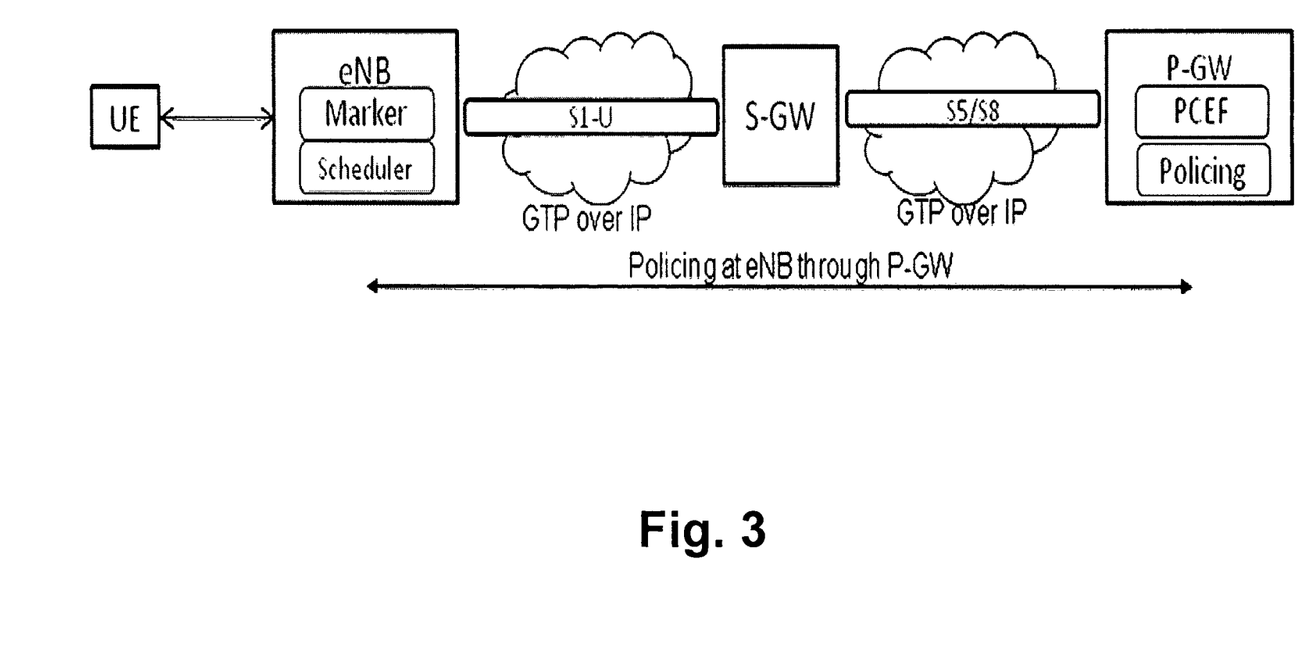
FIG. 3 is illustrating an embodiment of an implementation of a policing function for an uplink scenario according to the invention.

For incorporating the Re-ECN policer functionality at the MAC layer in the E-UTRAN, the policing mechanism itself is divided into two distinct phases: measurements and enforcements. During the measurements phase a Re-ECN policer instance is associated with the user traffic at the gateway. Such an instantiation can be triggered by detecting a Service Data Flow, SDF, at the gateway. The Re-ECN policer enforces the rate control on the user traffic against the allowed congestion quota that user is allowed to cause in the network over a configured time period. An example embodiment is illustrated in FIG. 3.

The rate control enforced by the Re-ECN policer at the gateway would waste radio allocations assigned to that user in the E-UTRAN therefore a second phase is introduced. It is proposed to trigger the enforcement phase on the expiry of congestion allowance assigned to that user. During the enforcement phase the policer will signal the MAC scheduler operating at the eNB to downgrade the service rate of that particular user. Here we propose to impose such a control for the non-GBR traffic classes in the LTE. As part of this invention we propose to use the signaling mechanism based on existing control messages, Bearer Modification request, conveyed from the gateway to the eNB. Generally, the default bearer is associated with the non-GBR traffic and the associated maximum allowed sending rate could be modified by the interaction between the gateway and the eNB.

Dropper for Downlink Traffic

The Re-ECN dropper polices those users that are not taking appropriate congestion response. For the congestion occurring in the downlink path from the gateway to the UE, the Re-ECN sender is required to re-insert the congestion response fed to it by the receiver.

Alternative #1

Figure 4:
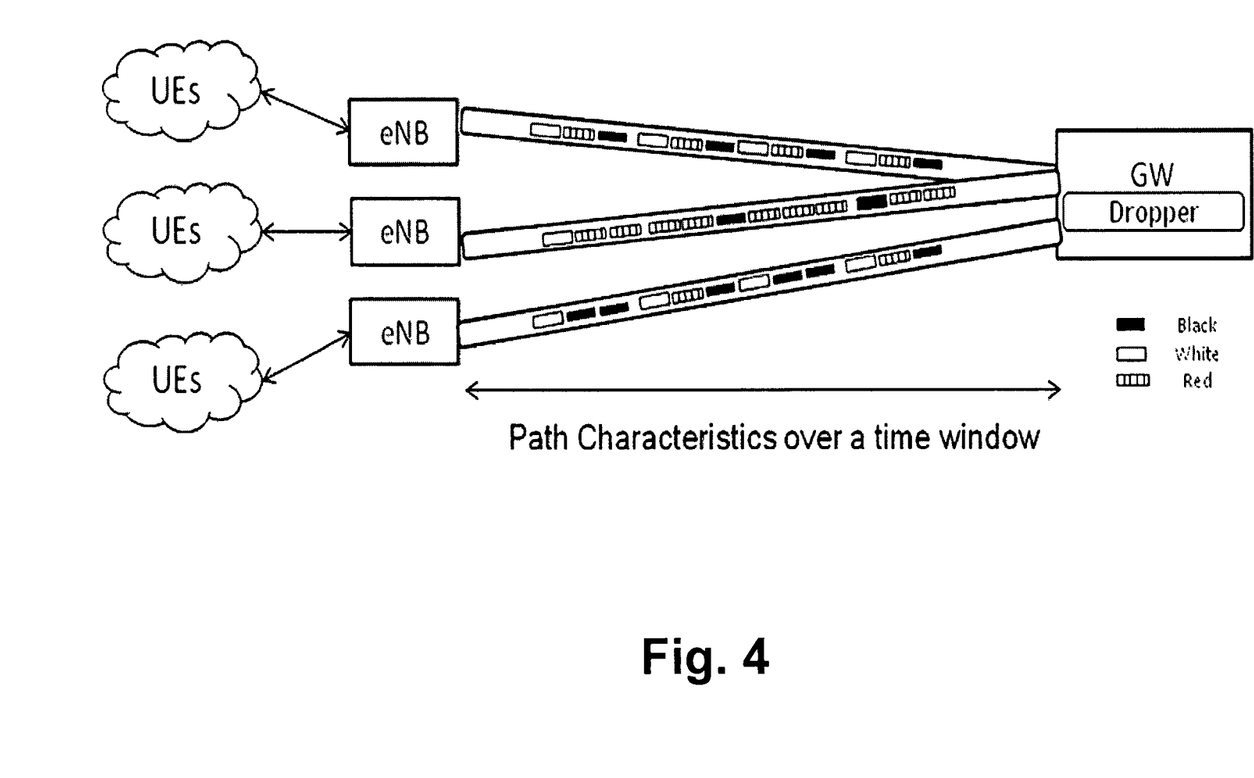
FIG. 4 is illustrating an embodiment of implementation of a dropper function for a downlink scenario at a gateway according to the invention and FIG. 5 is illustrating an embodiment of a dropper function for a downlink scenario at an eNodeB according to the invention.

The overall fraction of congestion and congestion response packets at the eNB could be taken as a good indicator for estimating the path congestion characteristics which are matched with the congestion response by the Re-ECN senders. Such a history can be incorporated at the eNB through maintaining a running average over a time window e.g. Exponentially Weighted Moving Averages (EWMA) across all flows at a particular eNB. Once the following condition is met the Re-ECN Dropper algorithm can be enforced at the gateway for packet drop in the downlink direction:

$$\text{weighted(congestion fraction)}_{downlink} - \text{weighted(congestion response fraction)}_{downlink} > \text{threshold}$$

This mechanism will drop packets at the gateway before they will traverse the path in MNO (Mobile Network Operator) towards the eNB. FIG. 4 shows the path characteristics for individual eNBs which is maintained for a specific time window across its traffic aggregate. It can also estimate the congestion rate coming from the gateway as well as its own marking rate for the E-UTRAN. If consistently over a configured time window, the congestion response is negative, the eNB must signal the dropper at the gateway to increase the dropping rate for the part of the traffic that is going towards that particular eNB. Such a distributed dropping behavior optimizes the backhaul bandwidth for packets that eventually will be dropped at the eNB. This behavior can be contrasted from the dropper algorithm that is running at the eNB in FIG. 5.

Alternative #2

Figure 5:
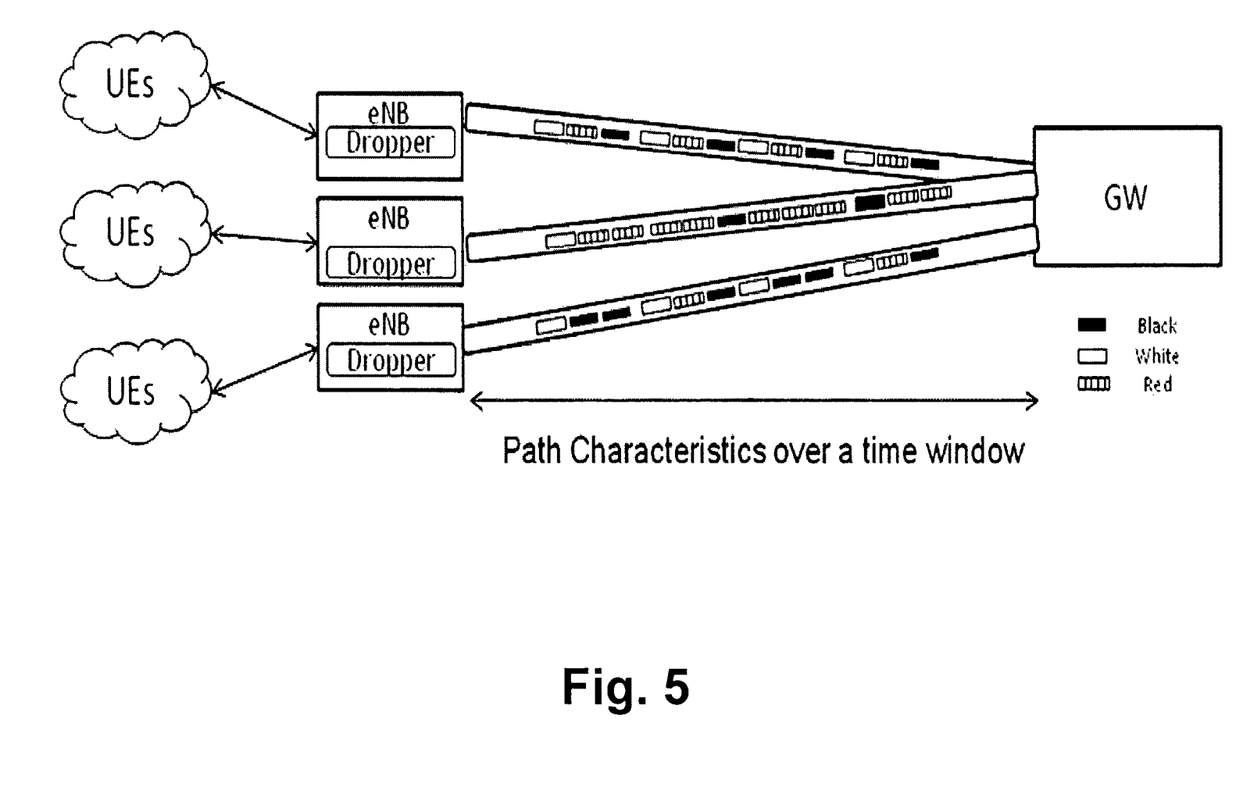

The overall fraction of congestion and congestion response packets at the eNB could be taken as a good indicator for estimating the path congestion characteristics which are matched with the congestion response by the Re-ECN senders. Such a history can be incorporated at the eNB through maintaining a running average over a time window e.g. EWMA across all flows at a particular eNB. Once the following condition is met the Re-ECN Dropper algorithm can be enforced at the eNB, as seen within FIG. 5.

$$\text{weighted(congestion fraction)}_{downlink} - \text{weighted(congestion response fraction)}_{downlink} > \text{threshold}$$

This mechanism will drop packets before they will enter the access network. By placing the dropper at the eNB complete path characteristics are taken into account. Though the approach is simplistic, it does not optimize the dropping behavior with regard to bandwidth as described in the alternative #1.

The invention is providing a de-centralized implementation of policing entity for employing Re-ECN at the MAC layer in the E-UTRAN and a de-centralized implementation of dropper entity for employing Re-ECN in the E-UTRAN. Further, the invention is providing a mechanism for triggering the Re-ECN dropper at the eNB for policing traffic of non compliant Re-ECN senders.

Further, this invention proposes to distribute the policing function onto the PDN-Gateway and the eNodeB and to optimize the efficiency of the dropping function by triggering it on-demand, i.e., when a misbalance of black- and white-marked packets occurs.

The invention is providing a better control and accountability of non-GBR user traffic, a better usage of radio spectrum among mobile users and an operator influence on allocations through user/system policies.

The present invention can be applied to produce better LTE/mobile network products, to build new Business Models for resource accountability around the proposed policing mechanism, and also to use Re-ECN for future congestion accountability of users in the mobile networks.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for resource management within a wireless network, comprising:
   performing a congestion control of data traffic, wherein, for congestion control, a Re-ECN (Explicit Congestion Notification) function is used wherein the Re-ECN function includes a policing function and a dropping function,
   wherein the policing function is divided in two distinct phases comprising a measurement phase and an enforcement phase,
   wherein, during the enforcement phase, the policing function signals a MAC scheduler operating at the base station or eNodeB to downgrade the service rate of the definable user, and
   wherein the used signaling is based on existing control messages conveyed from the gateway or P-GW to the base station or eNodeB.

2. The method according to claim 1, wherein the policing function is placed at a base station or an eNodeB.

3. The method according to claim 1, wherein the policing function is placed at the MAC (Media Access Control) layer in the eNodeB.

4. The method according to claim 1, wherein the dropping function is placed at a gateway or a Packet-Gateway (P-GW).

5. The method according to claim 1, wherein the dropping function is triggered at the eNodeB.

6. The method according to claim 1, wherein control messages is conveyed from the gateway or P-GW to the base station or eNodeB.

7. The method according to claim 1, wherein the policing function is distributed onto the P-GW and the eNodeB.

8. The method according to claim 1, wherein the dropping function is triggered on-demand.

9. The method according to claim 1, wherein a maximum allowed sending rate is modified by an interaction between the gateway or P-GW and the base station or eNodeB.

10. The method according to claim 1, wherein the policing function or a policer instance is associated with user data traffic at a gateway or at a P-GW during the measurement phase.

11. The method according to claim 1, wherein the policing function or the policer instance is triggered by detecting a data flow or Service Data Flow (SDF) at the gateway or P-GW.

12. The method according to claim 1, wherein the enforcement phase is triggered on an expiry of a congestion allowance assigned to a definable user.

13. A wireless network for carrying out the method for resource management within a wireless network according to claim 1, wherein a congestion control of data traffic is performed such that, for congestion control a Re-ECN (Explicit Congestion Notification) function is implemented within the network, wherein the Re-ECN function comprises a policing function and a dropping function.

14. A method for resource management within a wireless network, especially EPS (Evolved Packet Core) of LTE (Long Term Evolution) network, comprising:
   performing a congestion control of data traffic, wherein, for congestion control, a Re-ECN (Explicit Congestion Notification) function is used wherein the Re-ECN function includes a policing function and a dropping function,
   wherein an overall fraction of congestion packets and congestion response packets at the base station or eNodeB are as an indicator for estimating path congestion characteristics,
   wherein a dropping function is activated at the base station or eNodeB, once the following condition is met:

$$\text{weighted(congestion fraction)}_{downlink} - \text{weighted(congestion response fraction)}_{downlink} > \text{threshold},$$

and wherein the threshold has a definable value.

15. The method according to claim 14, wherein the weighting algorithm comprises a running average over a definable time window across all data flows at a particular base station or eNodeB.

16. The method according to claim 15, wherein the running average over a definable time window across all data flows at a particular base station or eNodeB comprises Exponentially Weighted Moving Averages (EWMA).

17. A wireless network for carrying out the method for resource management within a wireless network according to claim 14, wherein a congestion control of data traffic is performed such that, for congestion control, a Re-ECN (Explicit Congestion Notification) function is implemented within the network, wherein the Re-ECN function comprises a policing function and a dropping function.

18. A method for resource management within a wireless network, especially EPS (Evolved Packet Core) of LTE (Long Term Evolution) network, comprising:
   performing a congestion control of data traffic, wherein, for congestion control, a Re-ECN (Explicit Congestion Notification) function is used wherein the Re-ECN function includes a policing function and a dropping function,
   wherein an overall fraction of congestion packets and congestion response packets at the base station or eNodeB are as an indicator for estimating path congestion characteristics,
   wherein a dropping function is activated at the gateway or P-GW, once the following condition is met:

$$\text{weighted(congestion fraction)}_{downlink} - \text{weighted(congestion response fraction)}_{downlink} > \text{threshold},$$

and wherein the threshold has a definable value.

19. The method according to claim 18, wherein the weighting algorithm comprises a running average over a definable time window across all data flows at a particular base station or eNodeB.

20. The method according to claim 19, wherein the running average over a definable time window across all data flows at a particular base station or eNodeB comprises Exponentially Weighted Moving Averages (EWMA).

21. A wireless network for carrying out the method for resource management within a wireless network according to claim 18, wherein a congestion control of data traffic is performed such that, for congestion control, a Re-ECN (Explicit Congestion Notification) function is implemented within the network, wherein the Re-ECN function is comprising a policing function and a dropping function.

* * * * *